UNITED STATES PATENT OFFICE.

CARL ENOCH, OF HAMBURG, GERMANY.

METHOD OF MAKING SILICOFLUORIDS.

SPECIFICATION forming part of Letters Patent No. 672,210, dated April 16, 1901.

Application filed August 7, 1900. Serial No. 26,179. (No specimens.)

*To all whom it may concern:*

Be it known that I, CARL ENOCH, a subject of the German Emperor, and a resident of Hamburg, in the German Empire, have invented certain new and useful Improvements in Producing Silicofluorid of Sodium, of which the following is a specification.

Hitherto it has not been commercially practicable to produce or extract silicofluorid of sodium from highly-diluted silicofluoric acid for the reason that there was but one method known—namely, that of previously concentrating the dilute acid by evaporation—and it is only after this preliminary process that the sodium salt can be obtained by any ordinary process. These processes are theoretically possible, but are practically impossible, owing to the great costs involved by the said concentration, and as a consequence thousands of cubic meters of waste water containing small quantities—as, for example, one per cent.—of silicofluoric acid have been wasted. Now, however, I have found a process for obtaining from highly-diluted silicofluoric acid—that is to say, from waste waters—silicofluorid of sodium without the necessity of first concentrating the said waste waters, the product obtained by the improved process being entirely pure for industrial purposes and the process being theoretically sound and easy and safe in practice.

The process essentially is as follows: The waste waters, which may, perhaps, contain about one per cent. of silicofluoric acid, 0.2 per cent. of hydrofluoric acid, and 0.5 per cent. of sulfuric acid, are collected in a suitable tank or reservoir. From a warmed-up or heated sample of the liquid or waste water—say one cubic centimeter—is determined by titration the total acidity with normal or test soda-lye and with the use or aid of phenolphtaline as indicator. From the quantity (the amount of cubic centimeters) of soda-lye used the equivalent molecular quantity of sodium chlorid is calculated, and this is then recalculated for the entire volume of water contained in the tank, and the quantity of sodium chlorid so determined is added in substance—that is to say, in solid state, not in solution—to the waste water. Upon agitation the salt dissolves quickly and after a short time causes the silicofluorid of sodium to precipitate in the form of a heavy gelatinous deposit. The sulfuric acid and very small quantities of free hydrofluoric acid are also converted into their sodium salt, but remain in solution. The silicofluorid of sodium quickly deposits at the bottom, and the clear liquid is run off and the deposit filtered. The result is an almost theoretical yield in silicofluorid of sodium of snow-white appearance and, practically, entirely pure.

If there is much free hydrofluoric acid in solution, it may be recovered by means of an addition of silicic acid (sand) or it may be converted by silicious sodium into silicofluoric acid and then precipitated with common salt.

The new technical effect of the foregoing process consists in the fact that the extraction of silicofluorid of sodium from waste waters containing but small quantities of silicofluoric acid or even hydrofluoric acid, which extraction heretofore was impossible for industrial purposes, is by this process rendered easy and profitable.

Having fully described my invention, what I claim, and desire to secure by Letters Patent, is—

1. The process of recovering silicofluorid of sodium from aqueous solutions containing such, which consists in adding thereto solid sodium chlorid thereby causing the silicofluorid of sodium to be precipitated, for the purpose set forth.

2. The process of producing and recovering from solution silicofluorid of sodium, from waste waters containing hydrofluoric acid, which consists in adding a reagent capable of forming silicofluoric acid, then adding solid sodium chlorid thereby precipitating gelatinous silicofluorid of sodium, for the purpose set forth.

3. The process of producing and recovering from solution silicofluorid of sodium, from dilute waste aqueous solutions containing hydrofluoric acid, which consists in forming silicofluoric acid by the addition of sand and adding solid sodium chlorid, whereby silicofluorid of sodium is precipitated as a gelatinous deposit, substantially as set forth.

CARL ENOCH.

Witnesses:
MAX LEMCKE,
E. H. L. MUMMENHOFF.